(No Model.) 2 Sheets—Sheet 2.
A. C. EIDELBACH.
SAW GUMMER AND SHARPENER.
No. 357,913. Patented Feb. 15, 1887.
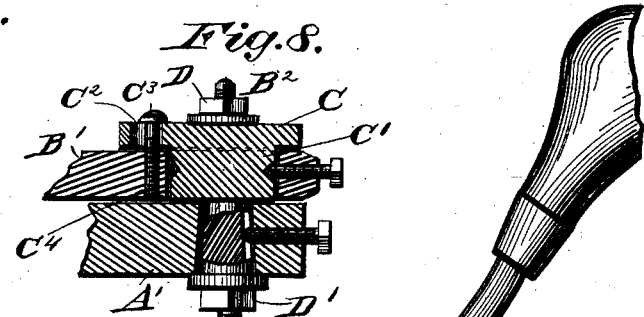
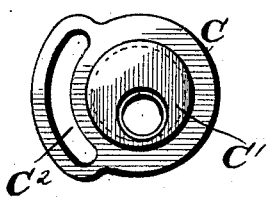
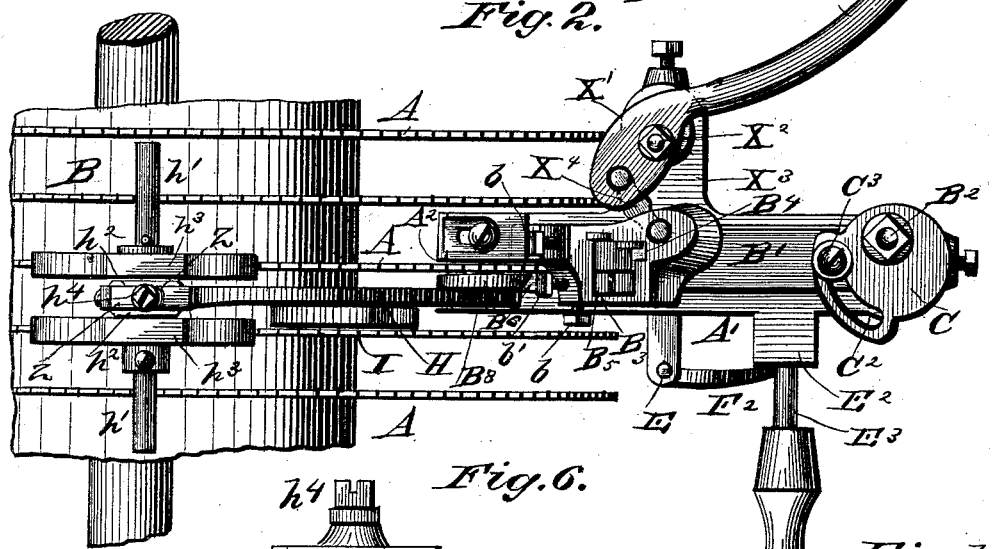
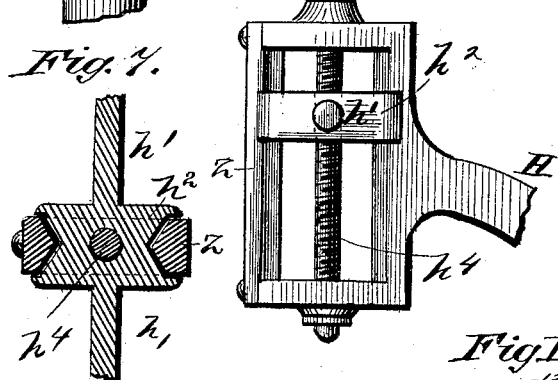
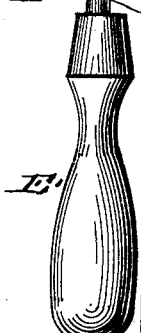
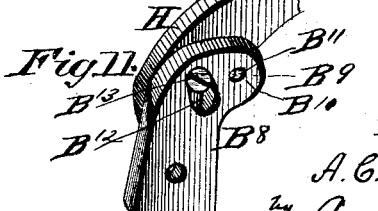
WITNESSES
Phil. C. Masi.
B. Frigitt.
INVENTOR
A. C. Eidelbach,
by Anderson & Smith
his Attorneys

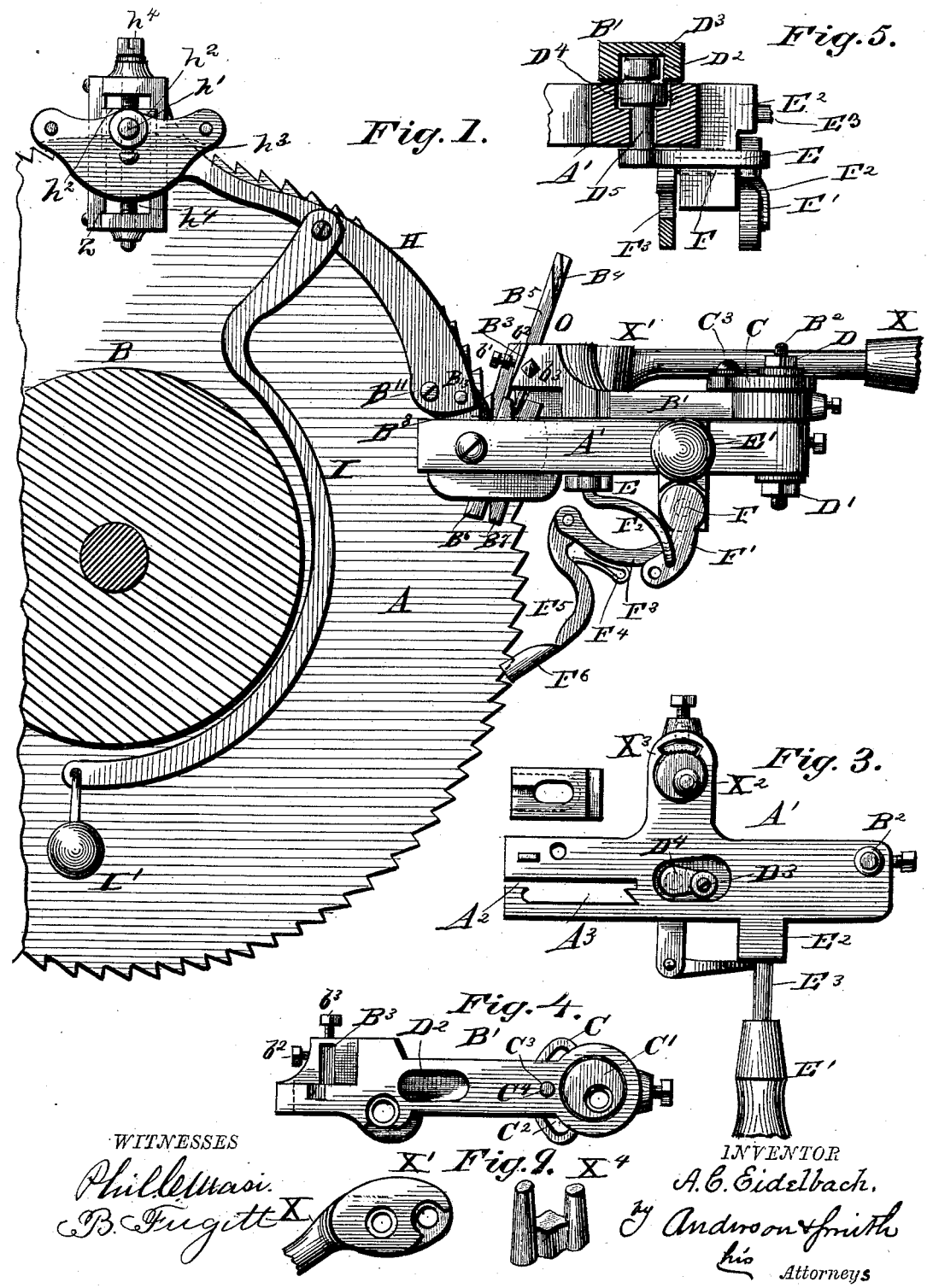

UNITED STATES PATENT OFFICE.

ANDREW C. EIDELBACH, OF FLATONIA, TEXAS.

SAW GUMMER AND SHARPENER.

SPECIFICATION forming part of Letters Patent No. 357,913, dated February 15, 1887.

Application filed September 16, 1885. Serial No. 177,232. (No model.)

*To all whom it may concern:*

Be it known that I, ANDREW C. EIDELBACH, a citizen of the United States, residing at Flatonia, in the county of Fayette and State of Texas, have invented certain new and useful Improvements in Saw Gummers and Sharpeners; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a side elevation, partly in section. Fig. 2 is a top plan view. Fig. 3 is a plan view of the head-block. Fig. 4 is an inverted plan view of the cutter-bar. Figs. 5, 6, 7, 8, 9, 10, 11, and 12 are detail views.

The invention relates to saw-gummers and saw-sharpeners, more especially designed to gum and sharpen gangs of gin-saws or a single circular saw; and it has for its objects to construct a machine which may be quickly and securely connected to the gang of saws, and may be readily adjusted thereon to cut the tooth, or to change the already-formed tooth to any required depth; also, to vary the pitch of the teeth, and to make the cutter-bars and other required parts of the machine as simple as possible in a machine of the class referred to; and to these ends the invention consists in the construction and novel combination of parts, as will be hereinafter fully described, and particularly pointed out in the claims.

Referring by letter to the accompanying drawings, A designates a gang of gin-saws, and B the arbor on which they are mounted. These saws are arranged in the usual manner, with collars forming spaces between them.

The machine itself is constructed as follows, and the saws are to be gummed and sharpened one at a time:

A' designates the head-block of the machine, which is kerfed vertically at $A^2$ in its forward end to receive a single saw of the gang of saws either to gum or sharpen the same, as may be desired.

B' designates the cutter-holder of the machine, which rests on the head-block, and has a pivotal lateral adjustment thereon to adapt the cutter or bit O to saws of different thicknesses. The cutter-holder B' is pivoted eccentrically at its rear end to the upper face of the head-block, a stud, $B^2$, rising from the upper face of the head-block A' and forming the pivot for the slotted eccentric cap-plate C and integral cam-plate C' on the under face of the cap-plate C. The slot $C^2$ of the cap-plate C is an arc-shaped slot, through which a stop-screw, $C^3$, having a head, and a washer beneath the head, passes into a screw-hole, $C^4$, in the cutter-holder B', and limits the reciprocating movement of the cutter-holder B'. Two nuts, D D', with a washer beneath them, hold the cutter-holder and eccentric in place on the head A'. In its under face the cutter-holder B' is provided with a groove, $D^2$, which is elliptical in outline, and the walls of said groove engage a friction-roll, $D^3$, on the upper arm of a double crank, $D^4$, which is seated in the groove $D^2$, and has its lower arm, $D^5$, extending down through the slot $D^2$, where said lower arm, $D^5$, is provided with a horizontal lever-arm, E, which extends out on the same side as the handle E'. The integral bearing $E^2$, from which the handle-rod $E^3$ extends, projects laterally and downwardly from the head-block A, and also extends under the head-block A, and forms a bearing for a short shaft, F, to the outer end of which shaft is secured a crank-arm, F', having two or more holes made laterally through it near its lower end, and this arm F' is connected with the horizontal lever-arm E by a curved connecting-rod, $F^2$, so that said arms F' and E work together when the machine is operated.

To the inner end of the short shaft F is secured a downwardly-extending curved arm, $F^3$, provided with a spring, $F^4$, secured to its under face, and a downwardly-curved arm, $F^5$, which is hinged to the lower end of said arm F'. The spring $F^4$ bears normally against the rear edge of the curved arm $F^5$ and holds the dog $F^6$ at the lower end of said arm $F^5$ in engagement with the saw, so that the saw can be fed forward when the teeth are being operated on.

The cutter-holder B' is provided with an inclined throat, $B^3$, in which the upper bits or cutters, $B^4$ and $B^5$, are secured by screws $b'$ $b^2$ $b^3$. The head-block A' is provided with a vertical recess, $A^2$, in which the lower cutters or bits, $B^6$ $B^7$, and the shoulder-piece $B^8$ of the hinged curved arm H are secured, a screw, $B^{10}$, being passed through a hole, $B^{11}$, into a hole in the shoulder-piece $B^8$. An upwardly-extending curved arm, H, is pivoted to the upper forward end of the shoulder-piece $B^8$, and the latter is provided with an oval or curved slot, $B^{12}$, made through it in rear of the pivotal point, and through this slot $B^{12}$ a stop-screw, $B^{13}$, is passed into the arm H and limits the movement of said arm. At its upper end the arm H is provided with a frame, Z. Within this frame is an adjustable head, $h$, which is provided with lateral arms $h'$ $h'$. The head $h^2$ is adjusted by a screw, $h^4$. Upon the extended arms $h'$ $h'$ are pivoted guide-pieces $h^3$ $h^3$, which are recessed vertically, and receive therein the saw that is being gummed or sharpened, and these, together with the shoe on the lower curved hinged arm, prevent the saw from turning during the operation. These guide-pieces are rendered vertically adjustable by means of the threaded rod $h^4$, which passes through a threaded aperture in the head $h^2$ and bears in the upper and lower transverse walls of the frame Z, which is secured to the outer end of the arm H, and serves as a guide for the head-block $h^2$. A pivoted curved arm, I, is connected to one side of the upwardly-extending curved arm H, and depends therefrom, and is provided with a weight, I', at its lower end, which serves to hold the guide-pieces $h$ $h$ in place upon the saws. The cutter-shoulder and cutting-holder are moved by the eccentric-cam, actuated by the pivoted hand-lever, their movement bringing the cutting-edges of the cutters against the edge of the saw in the recess.

The operating-lever X is provided with a head, X', which is fulcrumed on a cam-stud, $X^2$, seated in an arm, $X^3$, extending laterally from the head-block, and is connected by a stud-link, $X^4$, to the cutter-bar B', so that by operating the lever X the cutter-bar will be both oscillated and reciprocated. The object of making the cutter-holder B' adjustable is to permit the adjustment of the bit to the die in case the bit does not fit correctly. The eccentric bolt, which holds the lever in place, acts as a crank when the nuts are loosened, and permits the cutter-holder B' to be adjusted to compensate for wear and also to suit saws of different thicknesses.

Having thus fully described my invention, what I claim as new, and desire to secure by Letters Patent of the United States, is—

1. The combination, with the head-block A', having the vertical kerf $A^2$ and elliptical groove $D^2$, of the cutter-holder B', the slotted eccentric cap-plate C, having the integral cam-plate C', and the curved slot, cutters, the double-stud link, and the operating-lever, substantially as specified.

2. The combination, with the head-block A' and eccentrically pivoted cutter-holder with its cutters, of the operating hand-lever, the spring-actuated pivoted retaining-dog, the hinged curved arm with pivoted vertically-adjustable guides at its forward end, and the pivoted curved arm with the weight at its lower end, substantially as specified.

3. The combination, with the curved arm H, provided with the guide-frame at its outer end, of the pivoted guide-pieces $h^3$ $h^3$, the adjustable head $h^2$, having lateral arms, and the adjusting-screw $h^4$, substantially as specified.

In testimony whereof I affix my signature in presence of two witnesses.

ANDREW C. EIDELBACH.

Witnesses:
J. D. O'DANIEL,
WM. STEIN.